United States Patent
Sizelove et al.

(10) Patent No.: US 9,916,013 B2
(45) Date of Patent: Mar. 13, 2018

(54) CONTROL UNIT FOR IN-FLIGHT ENTERTAINMENT SYSTEM

(71) Applicant: PANASONIC AVIONICS CORPORATION, Lake Forest, CA (US)

(72) Inventors: Steven Sizelove, Woodinville, WA (US); Mehdi Izadyar, Trabuco Canyon, CA (US); Marshal Perlman, Portola Hills, CA (US); Jared Randall, Seattle, WA (US); Jonah Griffith, Seattle, WA (US); Jeff Ladwig, Seattle, WA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 95 days.

(21) Appl. No.: 14/752,494

(22) Filed: Jun. 26, 2015

(65) Prior Publication Data
US 2016/0378199 A1   Dec. 29, 2016

(51) Int. Cl.
*G06F 3/023* (2006.01)
*B64D 11/00* (2006.01)
(Continued)

(52) U.S. Cl.
CPC .......... *G06F 3/023* (2013.01); *B64D 11/0015* (2013.01); *B64D 11/00155* (2014.12);
(Continued)

(58) Field of Classification Search
CPC ... G06F 3/023; B64D 11/00155; B64D 11/06; G06K 7/087
See application file for complete search history.

(56) References Cited

U.S. PATENT DOCUMENTS

| 5,627,891 A | * | 5/1997 | Gallagher | ........... B60R 11/0241 379/446 |
| 5,835,127 A | * | 11/1998 | Booth | ................ B64D 11/0015 725/76 |

(Continued)

FOREIGN PATENT DOCUMENTS

| EP | 2237294 A2 | 10/2010 |
| EP | 2237294 A3 | 1/2014 |

(Continued)

OTHER PUBLICATIONS

Harrison, Kirby J., "Cabin Electronics, It's the Cabin that Counts and what Counts in the Cabin is the Electronics," Aviation International News, Aug. 2012, www.ainonline.com.

(Continued)

*Primary Examiner* — Patrick Edouard
*Assistant Examiner* — Eboni Hughes
(74) *Attorney, Agent, or Firm* — Stetina Brunda Garred Brucker

(57) ABSTRACT

An in-flight entertainment system remote controller has a control unit with a generally planar configuration. The control unit has a gaming controls side, an opposed keyboard side, and a top edge segment between the gaming controls side and the keyboard side. A dock is mounted to a passenger seat structure, and defines an open receptacle that is receptive to the control unit. The dock defines an insertion axis that is substantially coplanar with the remote control unit when oriented for mounting. The top edge segment is exposed while the gaming controls side and the keyboard side are concealed, with the control unit in a retracted position.

20 Claims, 4 Drawing Sheets

(51) Int. Cl.
  *B64D 11/06* (2006.01)
  *G06F 3/02* (2006.01)
  *G06F 3/0482* (2013.01)
  *H01H 9/18* (2006.01)
  *G06K 7/08* (2006.01)

(52) U.S. Cl.
  CPC ............ *B64D 11/06* (2013.01); *G06F 3/0202* (2013.01); *G06F 3/0482* (2013.01); *G06K 7/087* (2013.01); *H01H 9/182* (2013.01)

(56) References Cited

U.S. PATENT DOCUMENTS

| | | | | |
|---|---|---|---|---|
| 6,034,688 | A * | 3/2000 | Greenwood | G06F 3/0485 715/784 |
| 6,735,309 | B1 | 5/2004 | Lemanski et al. | |
| 8,934,226 | B2 * | 1/2015 | Smith | G06F 1/1613 361/679.2 |
| 2009/0079705 | A1 * | 3/2009 | Sizelove | B64D 11/0015 345/173 |
| 2011/0047580 | A1 * | 2/2011 | Kurita | H04N 7/163 725/77 |
| 2012/0132746 | A1 * | 5/2012 | Sizelove | B64D 11/0015 244/118.6 |
| 2012/0139303 | A1 | 6/2012 | Westerink et al. | |
| 2014/0053185 | A1 * | 2/2014 | Bleacher | H04N 21/41422 725/26 |

FOREIGN PATENT DOCUMENTS

WO        95/29552      11/1995
WO    WO2009036375      3/2009

OTHER PUBLICATIONS

European Patent Office, Extended European Search Report, dated Nov. 14, 2016, 9 pages, Munich, Germany.

* cited by examiner

CONTROL UNIT FOR IN-FLIGHT ENTERTAINMENT SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to in-flight entertainment systems and control units therefor, and more particularly, to controllers that dock to individual passenger seat armrests.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips the passenger has some idle time, which the traveler may occupy with work, leisure, and/or rest.

Many passengers bring their own personal electronic devices such as smart phones, media players, electronic readers, tablets, laptop computers, and the like for the express purpose of keeping occupied. However, airlines also accommodate its customers with in-flight entertainment (IFE) systems. Although the specific installation may vary depending on the service class, each passenger seat is equipped with a display device, an audio output modality, an input modality, and a terminal unit. The display device is typically an LCD screen that is installed on the seatback of the row in front of the passenger, though in some cases it may be mounted to a retractable arm that is in turn mounted to the passenger's seat. The audio output modality is a headphone jack, to which a headphone, supplied either by the airline or by the passenger, may be connected. The terminal unit may generate the video and/or audio signals that are presented to the passenger via the aforementioned display device and audio output modality.

A wide variety of multimedia content can be made available to passengers with the IFE system. Recently released movies are a popular viewing choice, as are television shows such as news programs, situation as well as stand-up comedy shows, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, feeds from cameras mounted to the exterior of the aircraft, and so forth are available. The pre-recorded multimedia content is typically stored on an onboard central server, and streamed to the individual terminal units upon request over a local area network. The central server may also generate the display outputs for the aforementioned live video-only content based on the underlying data of the raw camera feed, flight status, etc.

The terminal unit may include a general-purpose data processor that can be programmed with instructions corresponding to one or more interactive software applications that communicates with the central server to retrieve the multimedia content, render the video and/or audio, and accept inputs from the passenger for selections for viewing/listening. The interactive applications thus implement a graphical user interface with which the user can navigate the multimedia content library that is stored on the central server.

The inputs are provided via a control unit, which, like the aforementioned display device, are individual to each passenger. The control unit is connected to the terminal unit, and can be removably mounted on the seatback of the row in front of the passenger or on one of the armrests of the passenger seat. A basic embodiment may include a few input buttons corresponding to up, down, left, and right inputs, for navigating between graphical user interface elements, as well as another button that corresponds to an enter, select, confirm, or other similar command. Earlier IFE systems that were based upon continuously looped "channels" of programming, and not on the more recent individual, in-demand selection of programming did not require the navigation of a graphical user interface, so the control units included channel increment/decrement buttons. Along these lines, volume increase/decrease buttons are also incorporated into the control units. Other onboard amenities such as overhead lights and flight attendant calling can also be operated with the control units, and thus include input buttons therefor.

Many in-flight entertainment systems also include video games that may be played by the passenger. The games may likewise be implemented as a series of pre-programmed instructions executed by the terminal unit. Interaction with such game software may be possible with the same control unit, with the aforementioned directional inputs being utilized therefor. The control unit may have additional buttons for different inputs to the game software (e.g., A, B, X, Y buttons).

Control units generally correspond to the available feature set of the deployed terminal units and the IFE system. As the data processing capabilities thereof have increased along with an expansion of functionality, existing control units have become outdated. Accordingly, there is a need in the art for enhanced control units that accommodate all of the input requirements of the latest IFE systems.

BRIEF SUMMARY

The present disclosure contemplates various embodiments of a remote controller for an in-flight entertainment system. Generally, the remote controller may be docked edgewise in passenger seat, preferably the armrest. Upon ejection from the dock, the remote controller may arise from the same in an edgewise fashion.

In accordance with one embodiment, the in-flight entertainment system remote controller may include a control unit that has a generally planar configuration. More particularly, the control unit may have a gaming controls side, an opposed keyboard side, and a top edge segment between the gaming controls side and the keyboard side. Additionally, the remote controller may include a dock that can be mounted to a passenger seat structure, e.g., the armrest. The dock may define an open receptacle that is receptive to the control unit. The dock may also define an insertion axis that is substantially coplanar with the remote control unit when oriented for mounting. The top edge segment may be exposed while the gaming controls side and the keyboard side are concealed, with the control unit in a retracted position.

Another embodiment of the present disclosure envisions a remote controller in removable engagement with a dock. The remote controller may include a control unit housing structure that is defined by a first elongate face, an opposed second elongate face, and a flat elongate edge thickness that corresponds to a housing top surface. The flat elongate edge thickness may be substantially normal to the first elongate face and the second elongate face. There may also be a first set of input controls disposed on the first elongate face of the control unit housing structure, as well as a second set of input controls disposed on the second elongate face of the control unit housing structure. Moreover, there may be a third set of input controls that are disposed on the housing top surface. The dock may further define an elongate slot with an opening profile generally conforming to an outline of the housing top surface, and may be receptive to the control unit housing structure in an edgewise relation thereto.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure is directed to control units for entertainment systems, such as an in-flight entertainment system for an aircraft. The detailed description set forth below in connection with the appended drawings is intended as a description of the presently preferred embodiments of the control unit, and is not intended to represent the only form in which it can be developed or utilized. The description sets forth the features of the control unit in connection with the illustrated embodiments. It is to be understood, however, that the same or equivalent functions may be accomplished by different embodiments that are also intended to be encompassed with the present disclosure. It is further understood that the use of relational terms such as first, second, distal, proximal, and the like are used solely to distinguish one from another entity without necessarily requiring or implying any actual such order or relationship between such entities.

Figure 1A:
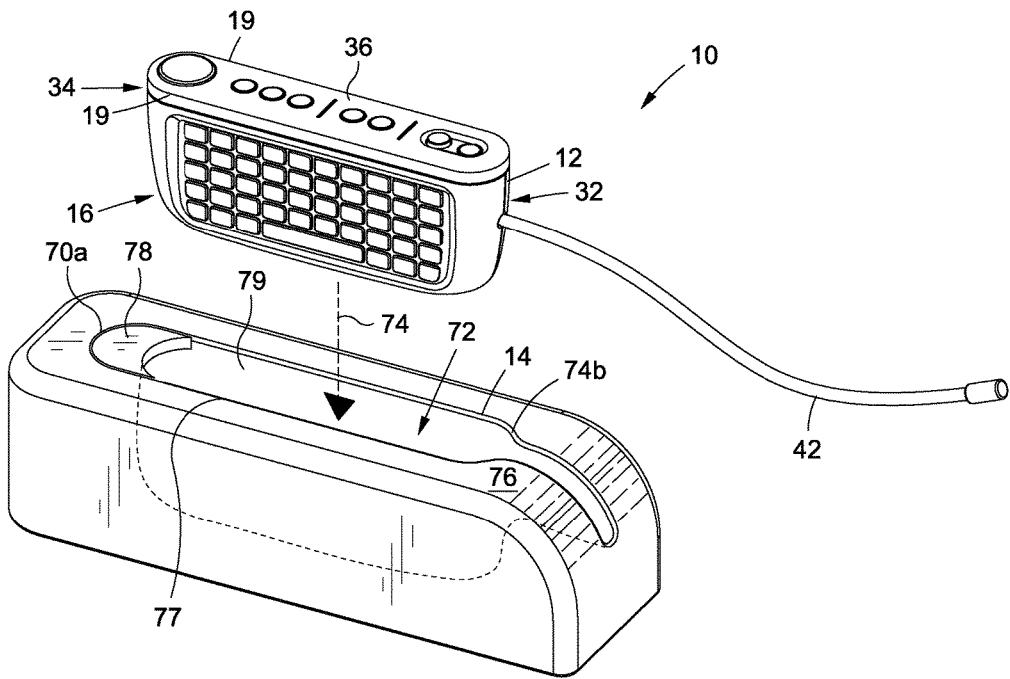
FIG. 1A is a perspective view of a remote controller system in accordance with one embodiment of the present disclosure including a control unit detached from a dock.
Figure 1B:
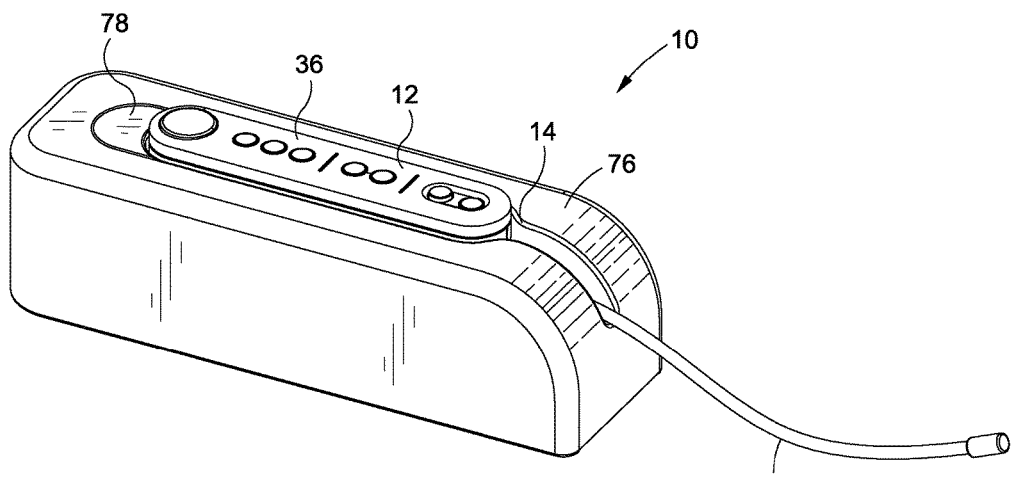
FIG. 1B is a perspective view of the control unit coupled to the dock but in an ejected state.

Referring to both FIG. 1A and FIG. 1B, one embodiment of a remote controller system 10 is comprised of a control unit 12 and a dock 14. The remote controller system 10 is contemplated to be deployed in passenger aircraft with an in-flight entertainment system, where each seat is equipped with a video display and an audio jack for passengers to enjoy various multimedia content, games, and the like. However, this is by way of example only and not of limitation, and the remote controller system 10 of the present disclosure may be utilized in a variety of other contexts.

The remote controller system 10, and specifically the control unit 12 thereof, can be one of the modalities by which the passenger/user interfaces with the in-flight entertainment system. For example, the control unit 12 may be utilized to navigate a multimedia content library of the in-flight entertainment system. More broadly, the control unit 12 may be utilized for inputting data and/or commands to various software applications being executed on the in-flight entertainment system such as games, e-mail applications, web browser applications, chat applications, and so forth. Various aircraft amenities may also be activated via the control unit 12. It will be appreciated by those having ordinary skill in the art that the remote controller system 10 of the present disclosure may be utilized in other contexts where there are similar user input considerations, and not necessarily limited to aircraft or to in-flight entertainment systems.

As generally illustrated in FIG. 1A and FIG. 1B, and shown in further detail in FIGS. 3-6, the control unit 12 has a generally planar configuration. In one embodiment, the control unit 12 is defined by a keyboard side 16 and an opposed gaming controls side 18. Notwithstanding such specific reference to the "keyboard" side or the "gaming control" side, it is to be understood that this is by way of referential convenience only, and not of limitation. These sides have been so referenced because of the specific features thereof being utilized or suitable for a physical keyboard or a gaming controller, respectively, as will be described in further detail below. In other embodiments, these sides may be more generally referred to as a first side and a second side. To the extent that the control unit 12 includes features that may be better suited for other applications, the present disclosure is understood to encompass such alternatives. For instance, all references herein to the keyboard side 16 and the gaming controls side 18 are understood to be applicable to the corresponding features of the alternative embodiments.

Figure 3:
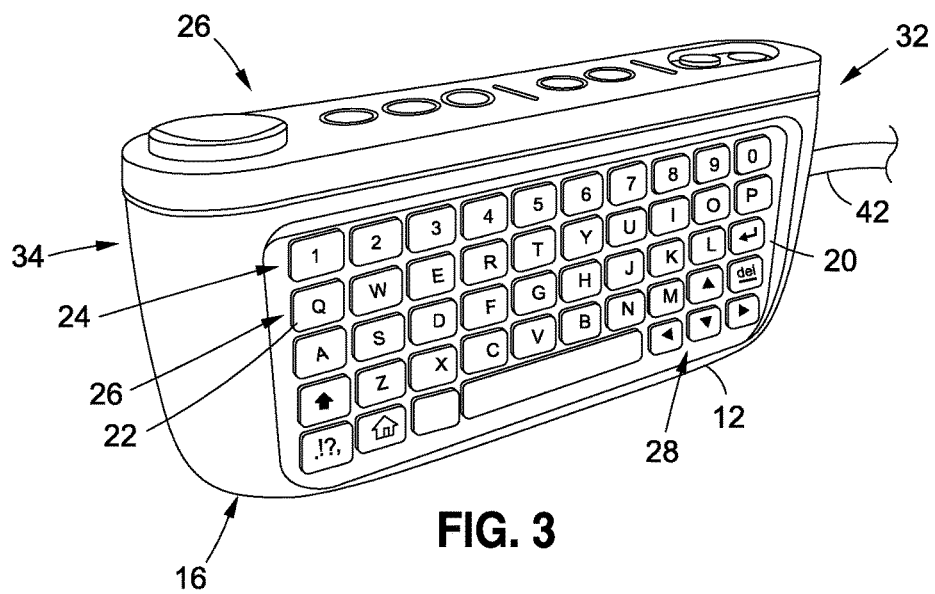
FIG. 3 is a detailed perspective view of the control unit showing a keyboard side and a remote control or gaming side thereof.
Figure 5:
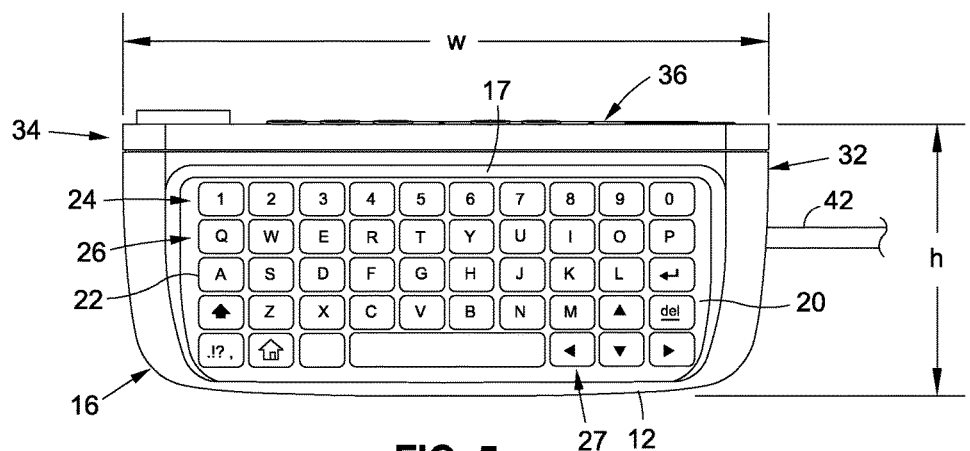
FIG. 5 is a first side view of the control unit showing the keyboard side thereof.

Referring to FIGS. 3 and 5, as suggested by its name, the keyboard side 16 includes a keyboard 20 comprised of a plurality of keys 22 corresponding to various input characters. The keyboard side 16 is generally defined by a first elongate face 17, upon which the keyboard 20 is disposed. The keyboard 20 may be more generally referred to as a first set of input controls. By way of example, the various keys 22 of the keyboard 20 are arranged according to a predefined layout including a numeric character row 24, an alphabet character section 26 comprised of individual keys 22 corresponding to letters A-Z, along with various cursor/directional keys 27. Additionally, the keyboard 20 may include modifier keys (such as shift) and home keys. One embodiment contemplates a QWERTY layout, though any other suitable layout may be substituted without departing from the present disclosure.

As will be described in further detail below, the individual keys 22 are mechanical switches that, when activated, generate a signal that is interpreted as a corresponding input of a particular character, modifier, and so forth. These switches may also be mechanically biased, such that some resistance is encountered during presses, and some tactile feedback is provided upon release. The mechanical switches may be substituted with touch sensors that use capacitive, resistive, or any other electrical sensing modality, and do not have a physical range of motion. Feedback for a detected input may be provided via vibrations or the like generated by asymmetrically weighted or unbalanced motors. Other input buttons that are described herein as being implemented with electro-mechanical switches may be similarly substituted with touch sensors.

The face of the keys 22 and specifically the lettering thereof, may be transparent or at least partially light transmissive, so that in conjunction with an illumination source disposed within the interior of the control unit, a backlighting effect may be achieved. The backlighting may encompass the entirety of the keyboard 20, or certain sections may be obstructed as to another section so that different parts thereof can be selectively illuminated.

With the control unit 12 having a diminutive size, accurate and fast keyboard input may present a challenge to the user/passenger. The size of each individual key 22 is maximized to encompass the widest area of available surface on the keyboard side 16. The separation between each key 22 may also be balanced with the size thereof to ensure optimal input accuracy. The particular size of the control unit 12 may be variable, though the different dimensional constraints are understood to be such that the keyboard 20 can be operated with thumb actuation as is typical of conventional mobile communications devices such as smart phones.

In the context of the in-flight entertainment system, the keyboard 20 may be used for text input to various software applications running thereon. One application that utilizes an onboard local area network is inter-passenger chat messaging, and the user may input text via the keyboard 20. Other applications may rely on an external network connection to the Internet, and can include e-mail, web browsing, multimedia streaming, and other conventional Internet functions. The keyboard 20 may also be utilized for inputting text for such applications.

Figure 6:
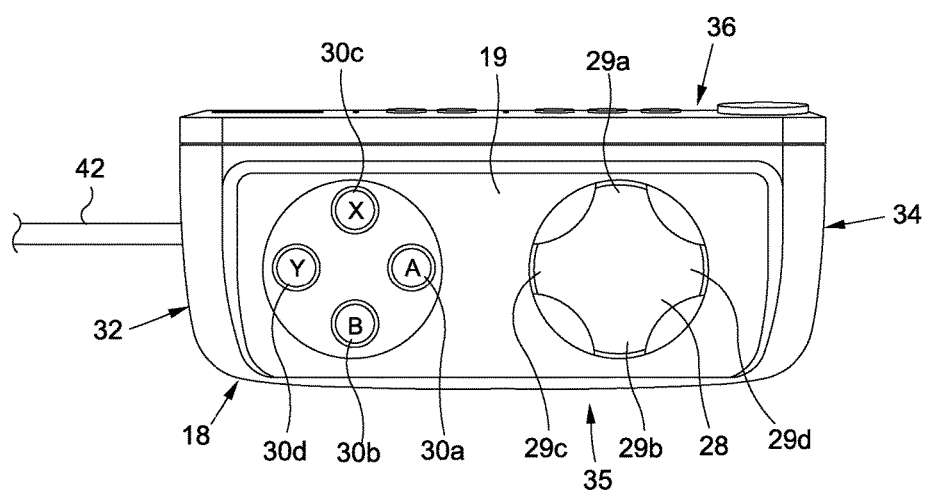
FIG. 6 is a second side view of the control unit showing the game control side thereof.

Referring now to FIG. 6, the opposite side of the keyboard side 16 is the gaming controls side 18 that is generally defined by a second elongate face 19. Disposed on the second elongate face 19 is, by way of example, a multidirectional pad 28 that can be actuated to input an upward direction 29*a*, a downward direction 29*b*, a leftward direction 29*c*, and a rightward direction 29*d*. Because the multidirectional pad 28 is understood to be primarily used for directional inputs to the interactive games, it may also be referred to as a gaming directional pad. Intermediate directions can also be actuated, such as a downward left direction that is a combination of the downward direction 29*b* and the leftward direction 29*c*. In such an implementation of the multidirectional pad 28, each of the aforementioned directions corresponds to a single button or actuator. The structure of the multidirectional pad 28 may be mounted on a pivot, allowing at most two of the buttons to be activated at any given time. Alternatively, the multidirectional pad 28 may have input buttons spaced in smaller increments for greater accuracy. Those having ordinary skill in the art will be able to readily substitute different implementations of the multidirectional pad 28 according to input specificity/accuracy requirements. The multidirectional pad 28 has a flat, generally disk-shaped configuration that minimally projects from the face of the control unit 12. Like the keys 22, the input buttons of the multidirectional pad 28 are understood to generate signals that are interpreted as corresponding input of the selected direction 29.

The gaming controls side 18 additionally includes one or more command buttons 30, also referred to as gaming action buttons because of the typically exclusive assignment to game input functions. In the illustrated example, there is an "A" command button 30*a*, a "B" command button 30*b*, an "X" command button 30*c*, and a "Y" command button 30*d*. The command buttons 30 may be arranged in a circular pattern, though the illustrated configuration is only exemplary, and any other suitable configuration may be utilized. There may be more or less of the command buttons 30 than the four shown, as different games may require a different number of command inputs. Various embodiments are contemplated to include at least one command button 30. Again, like the keys 22 and the multidirectional pad 28, the command buttons 30 generate signals that are interpreted as corresponding input of the activated ones, and may be mechanically biased so as to present resistance during actuation and present tactile feedback upon release. Furthermore, a similar backlighting effect may be employed in relation to the command buttons 30 as well. The axial projection of the command buttons 30 from the face of the control unit 12 is understood to be minimal, while remaining accessible to the user.

The set of the command buttons 30 may be in a spaced relationship to the aforementioned multidirectional pad 28, such that one hand operates the command buttons 30 while the other hand operates the multidirectional pad 28. Collectively, the multidirectional pad 28 and the command buttons 30 may be referred to as a second set of input controls. Because of the generally planar configuration of the control unit 12, similar to the keyboard 20, the command buttons 30 and the multidirectional pad 28 may be thumb-actuated, though different manipulations are possible. Additional command buttons 30 may be intended for actuation with an index finger, and positioned on the control unit 12 accordingly. For example, a command button 30 may be positioned on a bottom end 35 of the control unit 12, or even the keyboard side 16.

While the command buttons 30 are disposed toward a left side 32 of the control unit 12 while the multidirectional pad 28 is disposed toward an opposed right side 34 of the control unit 12 such that the command buttons 30 are actuated with the left hand/thumb and the multidirectional pad 28 is actuated with the right hand/thumb, this is also by way of example only and not of limitation. The relative positioning of the command buttons 30 and the multidirectional pad 28 may be reversed without departing from the present disclosure. As referenced herein, for the sake of consistency, the left side 32 and the right side 34 of the control unit 12 are understood to be with respect to the second elongate face 19, that is, the gaming controls side 18. When relative to the keyboard side 16, the left side 32 is understood to be toward the right end of the control unit 12, while the right side 34 is understood to be toward the left end of the control unit 12. Depending on the preference of the user, with duly made directional translations to the signal representing the inputs, the user may simply flip the control unit along its elongate axis, such that the multidirectional pad 28 remains positioned toward the left hand and the command buttons 30 are positioned toward the right hand. Indeed, this is the typical configuration for most gaming console controllers.

Figure 4:
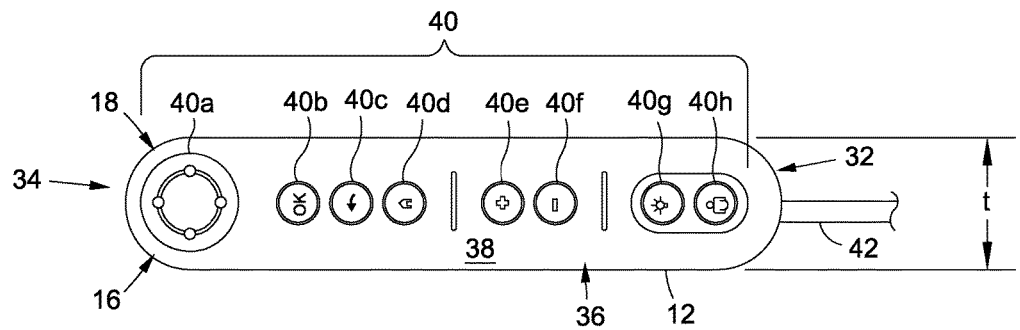
FIG. 4 is a top plan view of the control unit showing the remote control side thereof.

Between the keyboard side 16 and the gaming controls side 18, there is a top edge segment 36, with a top plan view thereof, and of the control unit 12, being shown in FIG. 4. The top edge segment 36 is understood to define a thickness (t) of the control unit 12, as well as a top surface 38. In this regard, the top edge segment 36 is understood to be substantially normal, e.g., perpendicular, to the first elongate face 17 and the second elongate face 19 as shown in the combination of FIG. 4 and FIG. 5 or 6. According to one embodiment, the top surface 38 is flat, though any other suitable surface configuration may be substituted. To improve user comfort, the left and right sides 32, 34 may have a slightly tapered configuration. Furthermore, the left and right sides 32, 34 both have an arcuate or circular profile, as particularly illustrated in FIG. 4. The curvature is defined throughout a substantial entirety of height (h) of the control unit 12.

Disposed on the top edge segment 36 and accessible from the top surface 38 is a set of input controls 40. Various embodiments contemplate a navigation directional pad 40a that can be used by the user to input up, down, left, and right directions. A similar configuration as the aforementioned multidirectional pad 28 on the gaming controls side 18 may be employed.

Additionally, there may be an "OK" button 40b, a back button 40c, and a home button 40d. Together with the navigation directional pad 40a, these inputs are understood to be utilized for the navigation of a multimedia content library or other simple graphical user interface that involves moving between hierarchically structured selectable user interface elements. Activating the "OK" button 40b, for example, may select a highlighted element and move a level down a menu hierarchy, while the back button 40c may move a level up the same menu hierarchy. The home button 40d may return the graphical user interface to a top level/root level of the menu hierarchy. These buttons may also be referred to as navigation action buttons, and some embodiments contemplate the placement thereof, together with the navigation directional pad 40a, at a location on the control unit 12 that remains accessible regardless of docking state, the details of which will be described in further detail below. The control unit 12 is understood to include circuitry that generates signals that correspond to these inputs.

Various other controls are envisioned to benefit from ready accessibility from the top edge segment. These include volume control buttons, which are disposed in a center region of the top edge segment 36. More particularly, there is a volume increase button 40e, as well as a volume decrease button 40f, which are understood to increase and decrease, respectively, the audio output volume in stepwise increments. Also accessible from the top edge segment 36 is a reading lamp button 40g, as well as a crew call button 40h. In some in-flight entertainment systems, volume, reading lamp, and crew calling functions (known in the art as passenger service systems or PSS) may be separated.

All of the input controls disposed on the top edge segment 36 may be accessed by the passenger at any given time, including those times when the interior lights have been dimmed and the cabin is dark. The navigation directional pad 40a and the various buttons 40b-40h are understood to be backlit so that they can be readily identified. Activating any one of the input controls 40 may in turn activate the backlighting for all. The permanence of the backlight may be variable. For example, the crew call button 40h and the reading lamp button 40g may be permanently illuminated, while the navigation directional pad 40a may be illuminated for a set time only after the user provides an input. Those having ordinary skill in the art will recognize the various techniques by which the operation of the backlight together with user input can be modified for improved intuitiveness. The input controls on the top edge segment 36 are preferably the most commonly used functions by passengers, while less commonly used functions are disposed on other surfaces. Thus, the control unit 12 provides an advantage in that passengers are able to use the unit to perform most functions without being required to eject it from the dock 14.

The signals corresponding to an activation of these buttons may thus be separate and independent of the signals corresponding to the other inputs discussed above. However, it is also possible for all of the signals to be transmitted to the in-flight entertainment system or a seat-specific terminal unit thereof over a single transmission modality, such as a Universal Serial Bus (USB) connection. At the physical layer, the transmission modality may be embodied in a cable 42 that extends from an interior of the control unit 12. Where there are multiple independent signal transmission lines, they may each be incorporated into the cable 42 as well. The other end of the cable 42 not connected to the control unit 12 may be coupled to a terminal in the dock 14, or extend to a suitable terminal of the in-flight entertainment system.

Figure 7:
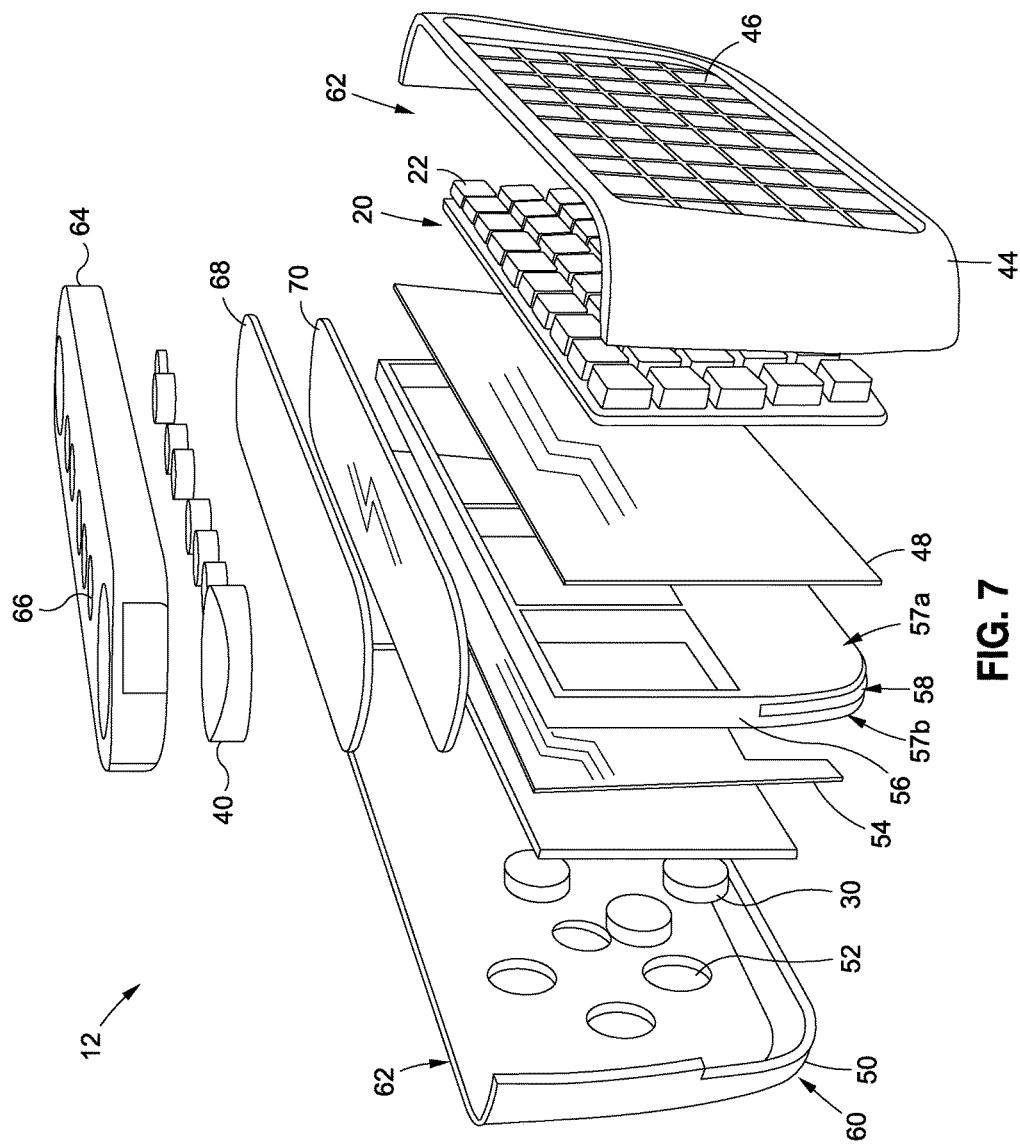
FIG. 7 is an exploded perspective view of the control unit in accordance with one embodiment of the present disclosure.

With reference to FIG. 7, in accordance with one embodiment of the present disclosure, the control unit 12 is defined by a plurality of partial shells, with various components disposed therein and made accessible from an exterior. A keyboard side enclosure shell 44 generally defines the aforementioned keyboard side 16, and includes a plurality of openings 46 for the keys 22 of the keyboard 20 to protrude. The keys 22 and the mechanical membrane switches therefor are mounted to a keyboard printed circuit board 48. It is understood that the keyboard printed circuit board 48 includes additional circuit components that translate the breaks in the circuit as a result of pressing a particular key 22 into a corresponding signal or code. A gaming controls side enclosure shell 50 generally defines the aforementioned gaming controls side 18, and likewise includes a plurality of openings 52 to provide access to the command buttons 30 that are mounted to a gaming controls printed circuit board 54. Both the keyboard printed circuit board 48 and the gaming controls printed circuit board 54 have a generally planar configuration with dimensions that are confined within the boundaries of the keyboard side enclosure shell 44 and the gaming controls side enclosure shell 50.

Within an interior defined by the keyboard side enclosure shell 44 and the gaming controls side enclosure shell 50, there is an internal frame 56 with a keyboard side 57a and an opposed gaming controls side 57b. The keyboard printed circuit board 48 is understood to be mounted to the keyboard side 57a of the internal frame 56, and the gaming controls printed circuit board 54 is understood to be mounted to the gaming controls side 57b of the internal frame 56.

Via the in-flight entertainment system, a variety of paid goods or services may be offered. For instance, the user can browse a catalog of goods that are available for purchased while aboard. Furthermore, Internet access, premium meals, drinks, etc. may also be purchased. Although the crew can accept cash, the most convenient payment modality is likely to be credit cards and debit cards. To this end, the control unit 12, and in particular the internal frame 56 may be equipped with a magnetic strip reader.

As will be recognized by those having ordinary skill in the art, a credit card can be rapidly swiped through the magnetic strip reader as guided along by a magnetic strip slot 58 that is defined by the internal frame 56. The magnetic strip reader is exposed within magnetic strip slot 58, and captures the payment information encoded on the payment card. The data may be stored in the in-flight entertainment system for further processing upon landing and connecting to a credit card processing network. Moreover, an existing airborne Internet or other wide area network connection to the credit card processing network may be utilized for immediate handling. A swipe is understood to be lengthier than the contemplated width (w) of the control unit 12 as shown in FIG. 5, so one or both of the sides 32, 34 may define an opening 60 that is aligned with the magnetic strip slot 58. In the embodiment shown in FIG. 7, only the gaming controls side enclosure shell 50 incorporates a cutout for the opening 60, though it is possible for the keyboard side enclosure shell 44 to define a partial cutout.

The keyboard side enclosure shell 44 and the gaming controls side enclosure shell 50 are attached to each other, enclosing the aforementioned components, e.g., the gaming controls printed circuit board 54 and the command buttons 30 and the multidirectional pad 28 mounted thereto, the internal frame 56, and the keyboard printed circuit board 48 and the keyboard 20 mounted thereto. However, the keyboard side enclosure shell 44 and the gaming controls side enclosure shell 50 also define an open top end 62 that is capped with a top enclosure cover 64. Thus, in some embodiments, the top enclosure cover 64 is attached to both the keyboard side enclosure shell 44 and the gaming controls side enclosure shell 50. Generally, the top enclosure cover 64 is understood to correspond to the top edge segment 36 of the control unit 12, and defines the thickness (t) of the same, as shown in FIG. 4. The top enclosure cover 64 defines a plurality of holes 66 through which the input controls 40 protrude. The input controls 40, in turn, are mounted to a spacer 68, and attached to a top end printed circuit board 70.

Figure 2:
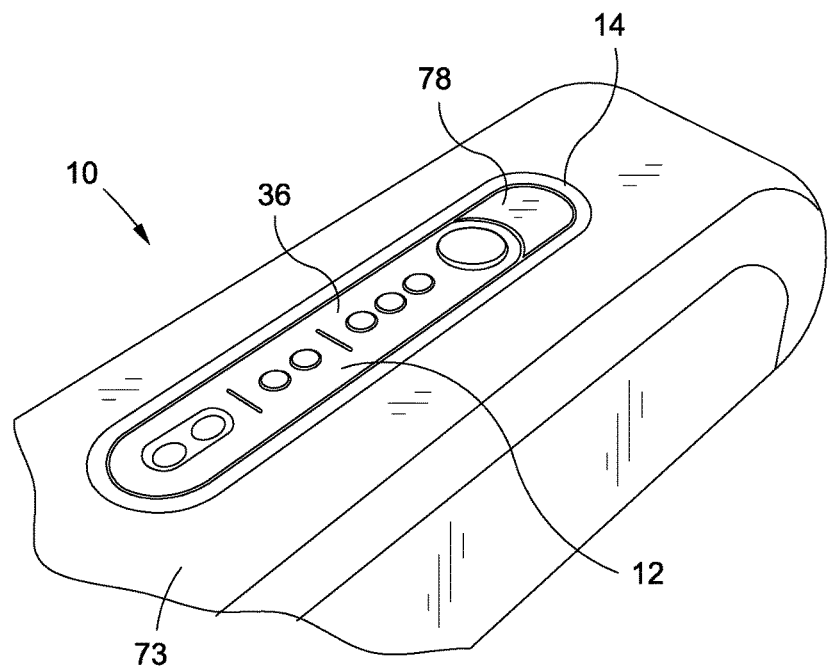
FIG. 2 is a perspective view of the control unit coupled to the dock an in a fully retracted state with the control unit being flush with the dock.

Referring now to FIG. 1A, FIG. 1B, and FIG. 2, various embodiments of the present disclosure contemplate the above-described control unit 12 being stowed within the dock 14. As best shown in FIG. 1A, the dock 14 is defined by an open receptacle 72 that is receptive to the control unit 12. An insertion axis 74 is understood to be substantially coplanar with the control unit 12 when oriented for mounting.

In further detail, the open receptacle 72 may also be characterized as an elongate slot with an opening profile that generally conforms to an outline of the top edge segment 36. A first rounded end configuration 74a of the slot generally corresponds to the rounded end configuration of the right side 34 of the control unit 12, two elongate segments 77, 79 of the slot generally corresponds to the edge adjacent to the first elongate face 17 and the edge adjacent to the second elongate face 19, respectively. A partial second rounded end configuration 74b of the slot generally corresponds to the rounded end configuration of the left side 32 of the control unit 12. As shown in FIG. 1B, the control unit 12 is fitted within the interior of the dock 14. In other words, the slot is receptive to the control unit 12 in an edgewise relation thereto. Thus, a depth of the open receptacle 72 is substantially equivalent to the height (h) of the control unit 12.

When mounted to a passenger seat structure 73 such as an armrest, an upper surface 76 of the dock 14 is envisioned to be substantially flush therewith. Further, as shown in FIG. 2, in a fully seated or retracted position, the top surface 38 of the control unit 12 is substantially flush with the upper surface 76 of the dock 14, as well as with the passenger seat structure. The keyboard side 16 and the gaming controls side 18 are concealed within the open receptacle 72, while the top edge segment 36 remains exposed and accessible. In the illustrated embodiment of FIG. 2, there is a biased eject button 78 that latches the control unit 12 in place, and in the aforementioned flush relationship to the upper surface 76 of the dock 14. Once the eject button 78 is depressed, the control unit is lifted up and partially protrudes from the elongate slot beyond the upper surface 76 as shown in FIG. 1B. This provides access for the user to lift the control unit 12 from the open receptacle 72. Although in this embodiment the eject button 78 is coupled to the dock 14, other embodiments in which the actuatable eject button 78 is part of the control unit 12 are also contemplated.

In an alternate embodiment, the remote controller system 10 includes a control unit 12 having an optional cable 42. In particular, the remote controller system 10 has a control unit 12 that transmits wireless signals according to known techniques such as that used for wireless keyboards and mice. For example, the signals may be transmitted and received by the control unit 12 via radio frequencies reserved internationally for industrial, scientific and medical purposes, such as UHF radio waves according to the standard known under the trademark BLUETOOTH or other standard and/or frequencies. In this alternate embodiment, the control unit 12 preferably includes a rechargeable battery or batteries and electrical charging terminals preferably on the surface opposite the top edge segment 36. When the control unit 12 is disposed in the dock 14, the charging terminals contact corresponding charging terminals in the dock 14 and charge the battery or batteries. A battery indicator is preferably also included on the top edge segment 36 to indicate the availability of sufficient power, e.g., an LED that illuminates when sufficient power is available. Instead of charging contacts, the control unit 12 may be provided with an inductive charging system for the battery or batteries. Generally though, inductive charging is not as efficient as electrical contacts and typically results in increased weight and fuel usage for a vehicle. In this alternate embodiment, the cable 42 is not necessary but may be retained for security purposes, e.g., ensuring that control units 12 remain with the vehicle and do not become lost.

In another alternate embodiment, the remote controller system 10 includes a control unit 12 of two different sizes according to the travel class of a vehicle, i.e., economy and premium classes. Economy class usually has smaller seats than premium classes and the seats may not have sufficient space for a dock in the structure thereof to accommodate the control unit. For this purpose, a smaller control unit may be provided having less functions, but preferably retaining at least the same functions along the top segment 12, which are the most commonly used functions. Specifically, control units 12 for economy class may be thinner or have less depth to fit within the structure of a smaller seat.

The particulars shown herein are by way of example and for purposes of illustrative discussion of the various embodiments of the control unit only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed control unit may be embodied in practice.

What is claimed is:

1. An in-flight entertainment system remote controller for mounting to a passenger seat structure, the remote controller comprising:
a control unit having a generally planar configuration with a gaming controls side, an opposed keyboard side, and a top edge segment between the gaming controls side and the keyboard side; and
a dock mounted to the passenger seat structure, the dock defining an open receptacle receptive to the control unit and an insertion axis substantially coplanar with the remote control unit when oriented for mounting;
the top edge segment defining a thickness and a width for the control unit in which the width and thickness are orthogonal to one another and the width is the longest dimension of the control unit, a part of the top edge segment perpendicular to the gaming controls side and the keyboard side including a set of input controls, and the top edge segment being exposed while the gaming controls side and the keyboard side are concealed with the control unit in a retracted position.

2. The remote controller of claim 1, wherein the dock is flush with the passenger seat structure.

3. The remote controller of claim 1, wherein the top edge segment is flush with the dock in the retracted position.

4. The remote controller of claim 1, further comprising:
a directional pad and at least one action button disposed on the gaming controls side.

5. The remote controller of claim 1, further comprising:
a plurality of buttons corresponding to a keyboard disposed on the keyboard side.

6. An in-flight entertainment system remote controller for mounting to a passenger seat structure, the remote controller further comprising:
a control unit having a generally planar configuration with a gaming controls side, an opposed keyboard side, and a top edge segment between the gaming controls side and the keyboard side;
a dock mounted to the passenger seat structure, the dock defining an open receptacle receptive to the control unit and an insertion axis coplanar with the remote control unit when oriented for mounting;
a set of input controls disposed on the top edge segment at a part thereof perpendicular to the gaming controls side and the keyboard side;
wherein the top edge segment defines a thickness and a width for the control unit in which the width and thickness are orthogonal to one another and the width is the longest dimension of the control unit, and the top edge segment is exposed while the gaming controls side and the keyboard side are concealed with the control unit in a retracted position, and the set of input controls includes at least one input button selected from a group consisting of: a reading lamp activation button, a crew calling button, a volume increase button, and a volume decrease button.

7. The remote controller of claim 1, further comprising:
an eject button disposed on either the dock or the control unit.

8. The remote controller of claim 1, wherein the control unit is defined by a gaming side enclosure shell corresponding to the gaming controls side, a keyboard side enclosure shell corresponding to the keyboard side, and a top enclosure cover defining the top edge segment.

9. The remote controller of claim 8, wherein the gaming side enclosure shell is attached to the keyboard side enclosure shell, and the top enclosure cover is attached to both the gaming side enclosure shell and the keyboard side enclosure shell.

10. The remote controller of claim 1, further comprising:
a cable retractable into the dock and connected to the control unit, the cable including one or more signal transmission lines in communication with the in-flight entertainment system.

11. A remote controller in removable engagement with a dock, the remote controller comprising:
a control unit housing structure defined by a first elongate face, an opposed second elongate face, and a flat elongate edge thickness that corresponds to a housing top surface that is perpendicular to the first elongate face and the second elongate face;
a first set of input controls disposed on the first elongate face of the control unit housing structure;
a second set of input controls disposed on the second elongate face of the control unit housing structure; and
a third set of input controls disposed on the housing top surface;
wherein the dock defines an elongate slot with an opening profile generally conforming to an outline of the housing top surface, and is receptive to the control unit housing structure in an edgewise relation thereto.

12. The remote controller of claim 11, wherein the elongate slot is defined by a depth corresponding to a height of the control unit housing structure.

13. The remote controller of claim 11, wherein the dock is defined by an upper surface surrounding the elongate slot, the housing top surface being substantially flush with the upper surface of the dock with the control unit housing structure being received within the elongate slot, in a stored position.

14. The remote controller of claim 13, wherein the control unit housing structure partially protrudes from the elongate slot beyond the upper surface of the dock, in an ejected position.

15. The remote controller of claim 11, wherein the first set of input controls is a plurality of buttons corresponding to a keyboard.

16. The remote controller of claim 11, wherein the second set of input controls includes a gaming directional pad and at least one gaming action button.

17. The remote controller of claim 16, wherein the third set of input controls includes navigation directional pad and at least one navigation action button.

18. The remote controller of claim 11, wherein the third set of input controls includes at least one input button selected from a group consisting of: a reading lamp activation button, a crew calling button, a volume increase button, and a volume decrease button.

19. The remote controller of claim 11, further comprising:
a magnetic strip reader;
wherein the magnetic strip reader is exposed from within a magnetic strip slot defined by the control unit housing structure.

20. The remote controller of claim 11, wherein the control unit housing structure includes a first partial shell defining the first elongate face, a second partial shell defining the second elongate face, and a top cover defining the housing top surface.

* * * * *